May 7, 1968
C. D. MOORE
3,382,341
BRAKE SHOE WELDER
Filed Oct. 12, 1964
6 Sheets-Sheet 4
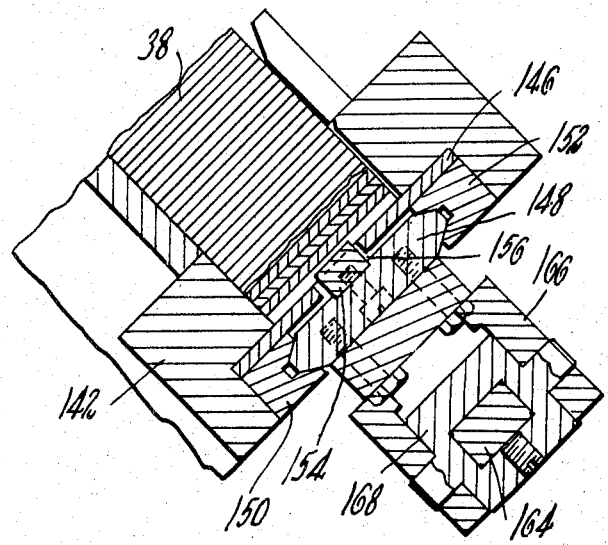
Fig. 4.
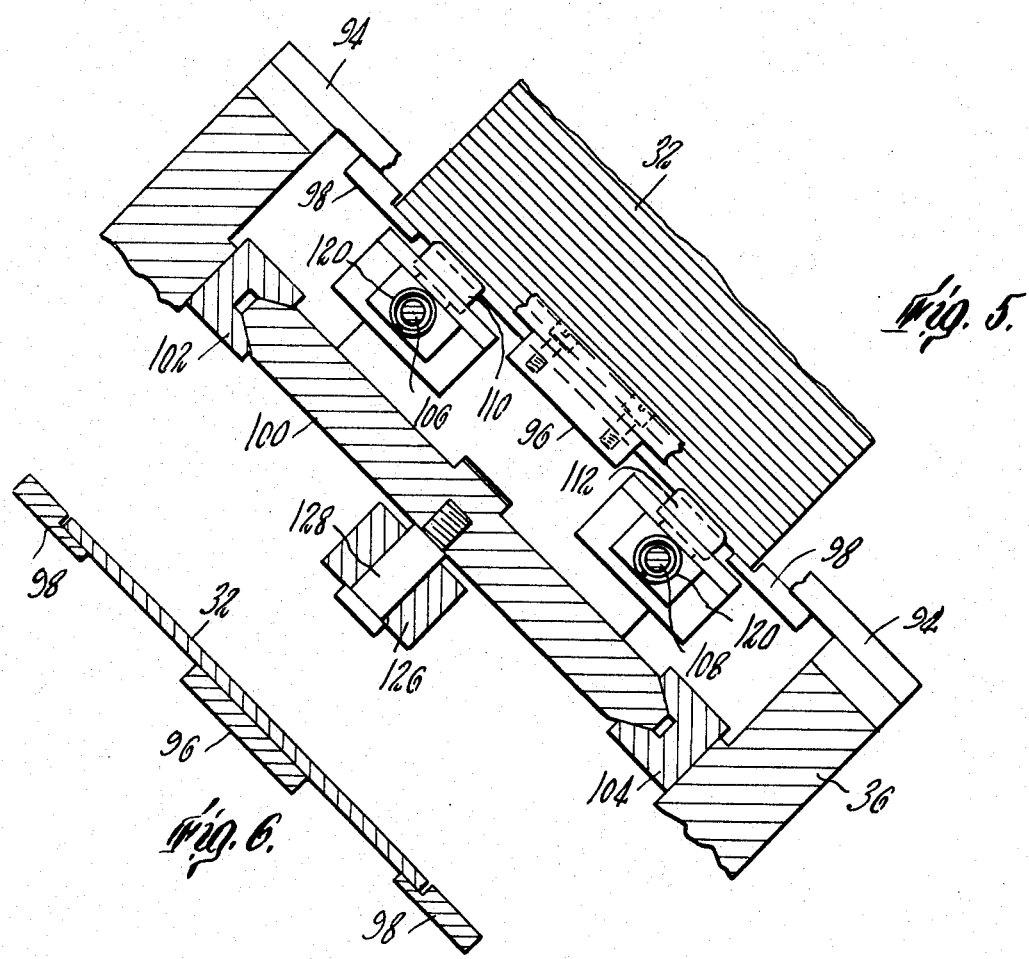
Fig. 5.
Fig. 6.

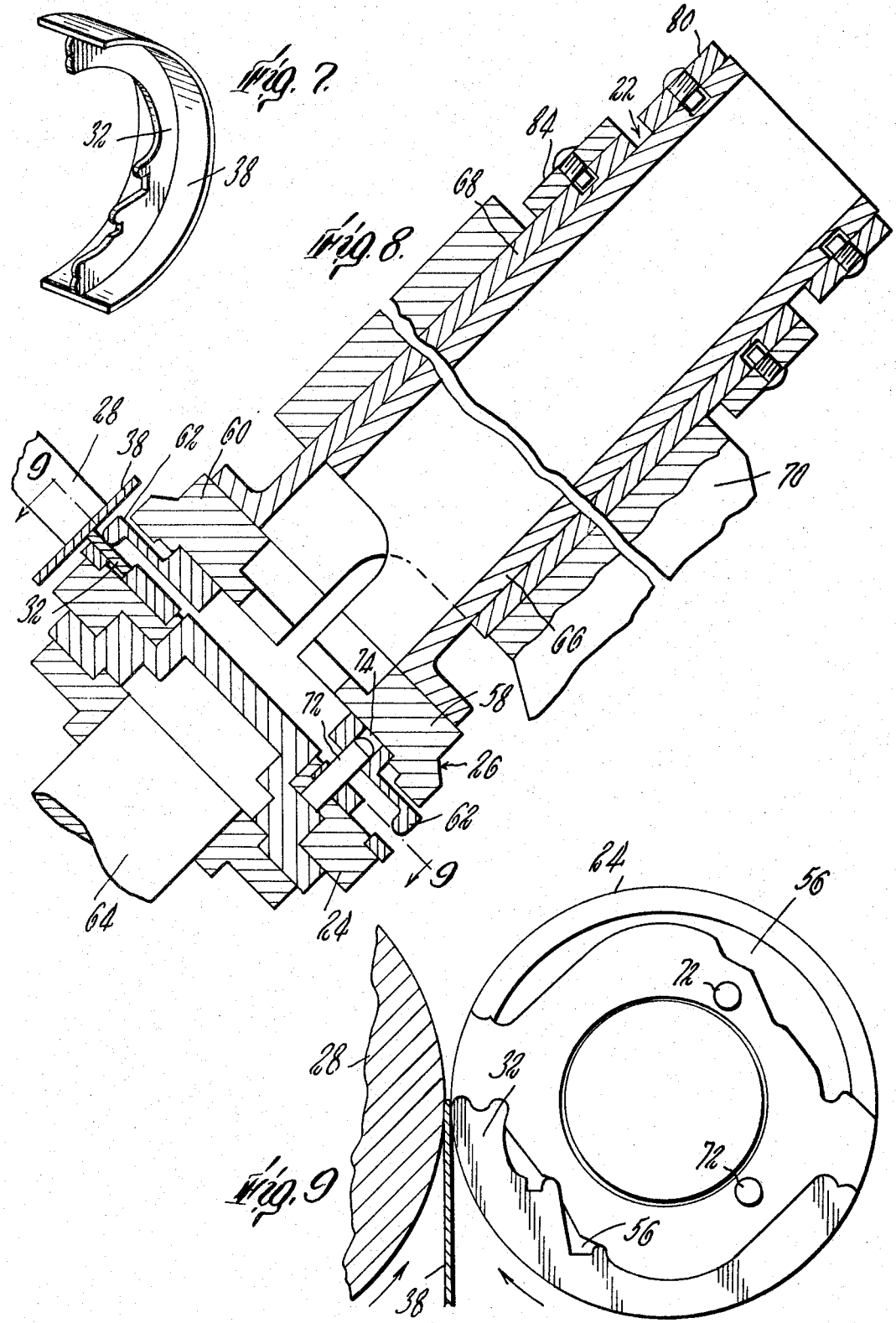

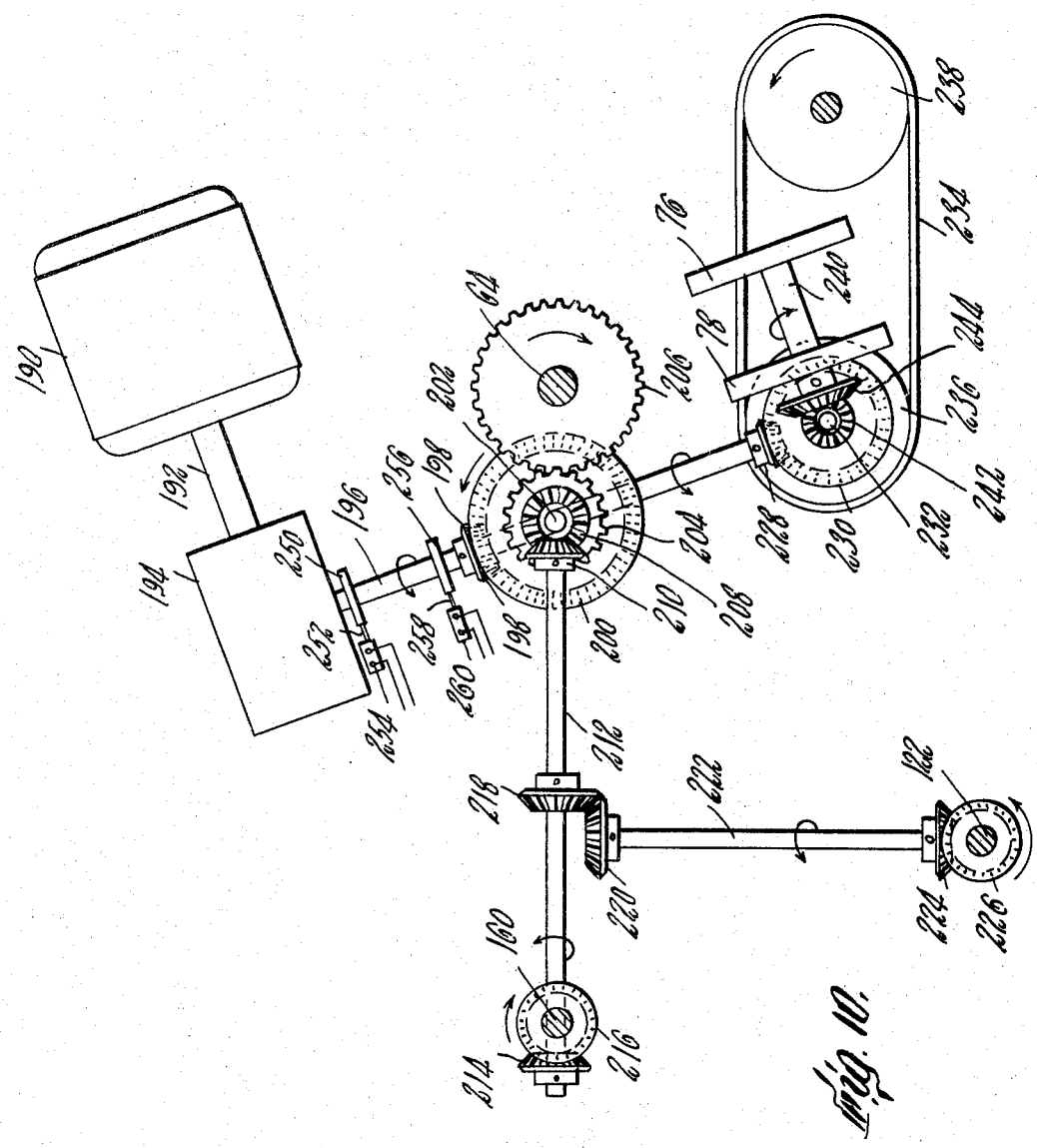

United States Patent Office 3,382,341
Patented May 7, 1968

3,382,341
BRAKE SHOE WELDER
Charles D. Moore, Rowley, Mass., assignor to Thomson Electric Welder Company, Inc., Lynn, Mass., a corporation of Massachusetts
Filed Oct. 12, 1964, Ser. No. 403,241
5 Claims. (Cl. 219—81)

ABSTRACT OF THE DISCLOSURE

The disclosure involves a machine for welding a band to the peripheral edge of an arcuate web in face-to-edge relation. Its major operating elements are a cylindrical formed welding head rotatable on an axis inclined at roughly 45° from the vertical having axially separable transverse clamping faces providing peripheral margins for clamping said web with the arcuate edge thereof exposed, an electrode wheel providing a welding nip between said web blank and a transversely fed band in face-to-edge relation in intersecting planes each sloping roughly 45° from the vertical, a web blank magazine in which web blanks are stacked for delivery by gravity to a plane normal to said welding head axis, a web blank pusher feed device on which web blanks are successively advanced in said plane from said magazine between the clamping faces of said welding head, a band blank magazine in which band blanks are stacked for delivery in the plane of said nip, and a band blank pusher feed device on which band blanks are successively advanced between said band blank magazine and said nip, at which the two parts are welded to produce the welded article which is thereafter ejected.

---

The present invention relates to an improved welding machine adapted for welding together parts located in edge-to-face relation, such, for example, as the rim and reinforcing web of a brake band.

In a welding machine of the general type herein described the arcuately shaped web is clamped between two cylindrically shaped members of a welding head, the flat rim being fed into a nip provided by the peripheral surface of the welding head and an electrode wheel, so that the rim is engaged against and is welded progressively to the exposed edge of the arcuate web across said nip during the continued rotation of the welding head and welding wheel.

It is a principal object of the invention to provide an improved construction and arrangement of the mechanisms for storing and for feeding the parts to be welded to the welding apparatus, and for thereafter ejecting the welded article from the machine in a continuous high speed operation.

A feature of the invention consists in an improved and simplified arrangement of the welding mechanism and associated devices for feeding the parts to be welded to the welding nip having storage magazines which are disposed at an angle to one another, and at substantial angles from the horizontal suitable for the gravity feed of the said parts permitting a simple transverse displacement of each part from its storage position to the welding nip with a resulting substantial improvement in efficiency and in speed of operation of the machine.

In the preferred embodiment of the invention shown, the parts to be welded are flat blanks which are presented to one another in intersecting planes. The welding head and electrode wheel are particularly constructed and arranged to bring together in a welding nip blanks which lie in planes sloped in opposite directions and at such angles from the vertical to permit blanks to be fed into said planes from gravity feed storage magazines rising from said planes. The feed of the blanks from storage to the welding nip is effected by a simple straight line displacement of the part in the respective plane.

In the embodiment shown for welding together the band and web parts of a brake band in face-to-edge relation, the welding devices including a welding head and electrode wheel are mounted to rotate on axes inclined approximately 45° for supporting and for advancing the parts to be welded during the welding operation, and magazines providing stacks of the respective parts are disposed in correspondingly inclined planes for delivery of blanks selected from said magazine stacks to the welding devices by means of feed devices which move the blanks along said planes directly from the respective magazines to the weld position.

More specifically a feature of the invention consists in a feed assembly for the arcuately shaped web blank having, in combination, a magazine in which the parts are stored in a stack inclined substantially from the vertical, a welding head supported to rotate on a correspondingly inclined axis and a feed slide which is constructed and arranged to advance a selected web blank in a single plane directly from the stack to a clamped position in the welding head preparatory for the performance of the welding operation.

Another feature of the invention consists in the provision of an improved ejector mechanism constructed and arranged to cooperate with said inclined welding head for the removal therefrom of each successively welded brake band while the welding head and associated electrode wheel continue in operation for the welding of the next succeeding article.

With the above and other objects in view as may hereinafter appear the several features of the invention consist also in the devices, combinations and arrangement of parts hereinafter described and claimed which together with the advantages to be obtained thereby will be readily understood by one skilled in the art from the following description taken in connection with the accompanying drawings in which:

Figure 2:
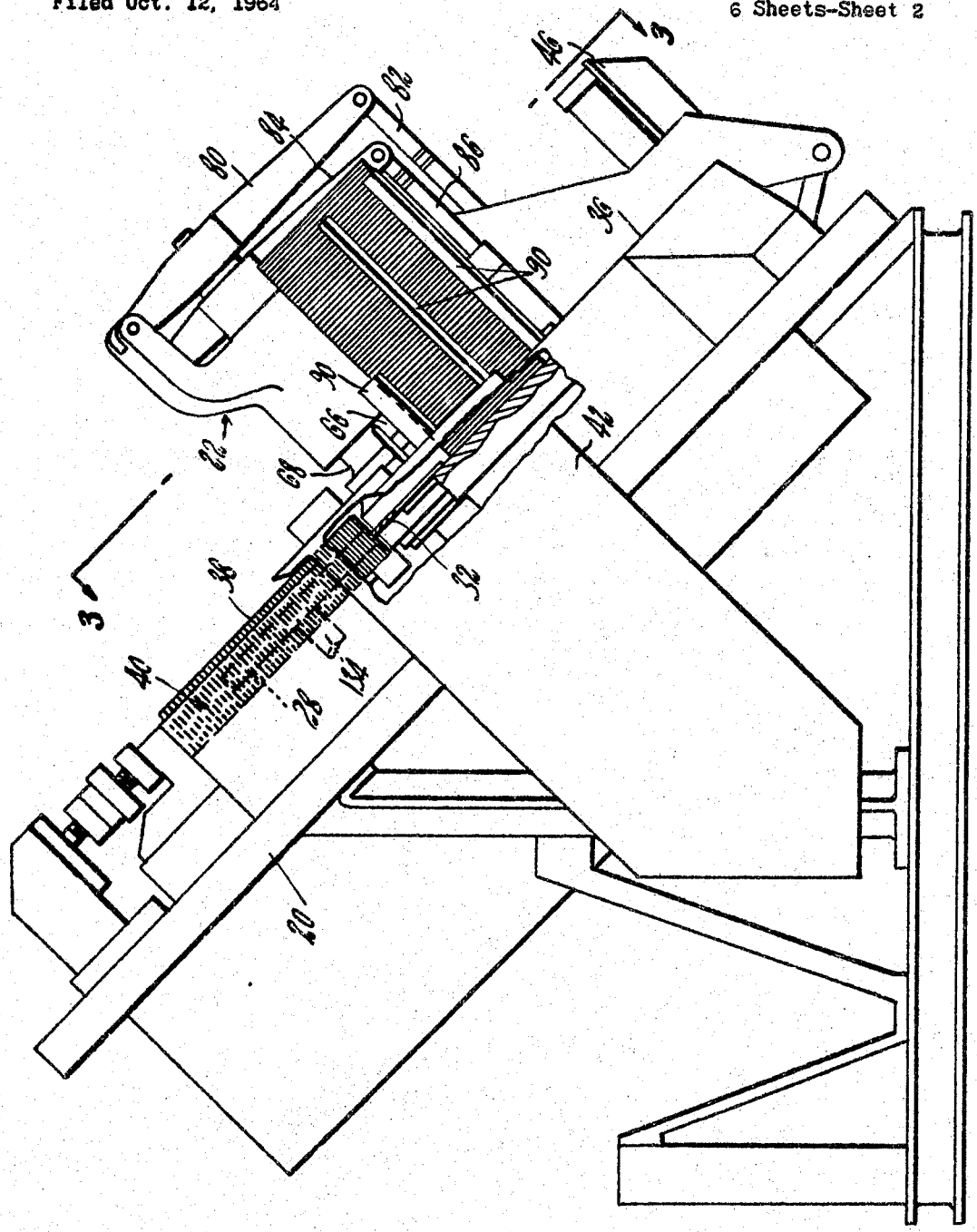
FIG. 2 is a view of the brake welding machine of FIG. 1 looking from the left.
Figure 3:
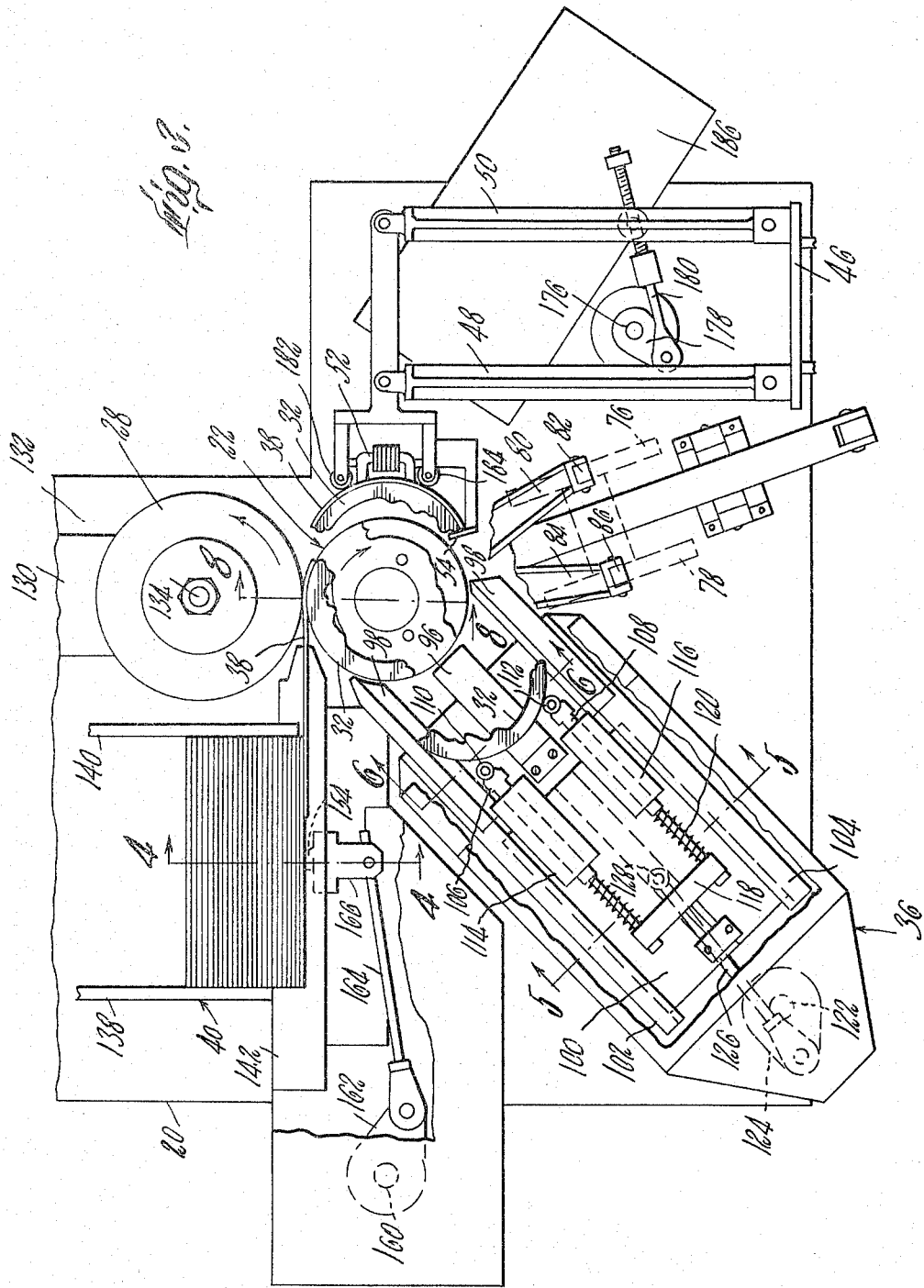

FIG. 3 is a view looking down upon the machine at a 45° angle being taken along the line 3—3 of FIG. 2 with portions broken away illustrating particularly the lower portion of the rotatable welding head, the brake web blank feed mechanism associated therewith, the electrode wheel and associated brake rim magazine and feed mechanism and the eejector mechanism for moving the welded brake band from the welding head;

FIG. 4 is a detail sectional view of the brake rim blank magazine and feed mechanism taken on a line 4—4 of FIG. 3;

FIG. 5 is a sectional view of the brake web blank stack and brake web blank feed mechanism taken on a line 5—5 of FIG. 3;

FIG. 6 is a detail sectional view taken on a line 6—6 of FIG. 3 illustrating particularly a web and elements of the supporting guideway on which the web is advanced into operative relation to the welding head;

FIG. 7 is a perspective view of a brake band having the rim and web elements thereof welded together in edge-to-face relation;

FIG. 8 is a sectional view on a line 8—8 of FIG. 3 and on an enlarged scale illustrating the welding head of the machine;

FIG. 9 is a detail sectional view taken on a line 9—9 of FIG. 8 illustrating particularly the lower web holding section of the welding head with one web supported in one of the shaped recesses provided therefor; and FIG. 10 is a somewhat diagrammatic view of the driving connections for the machine.

Figure 1:
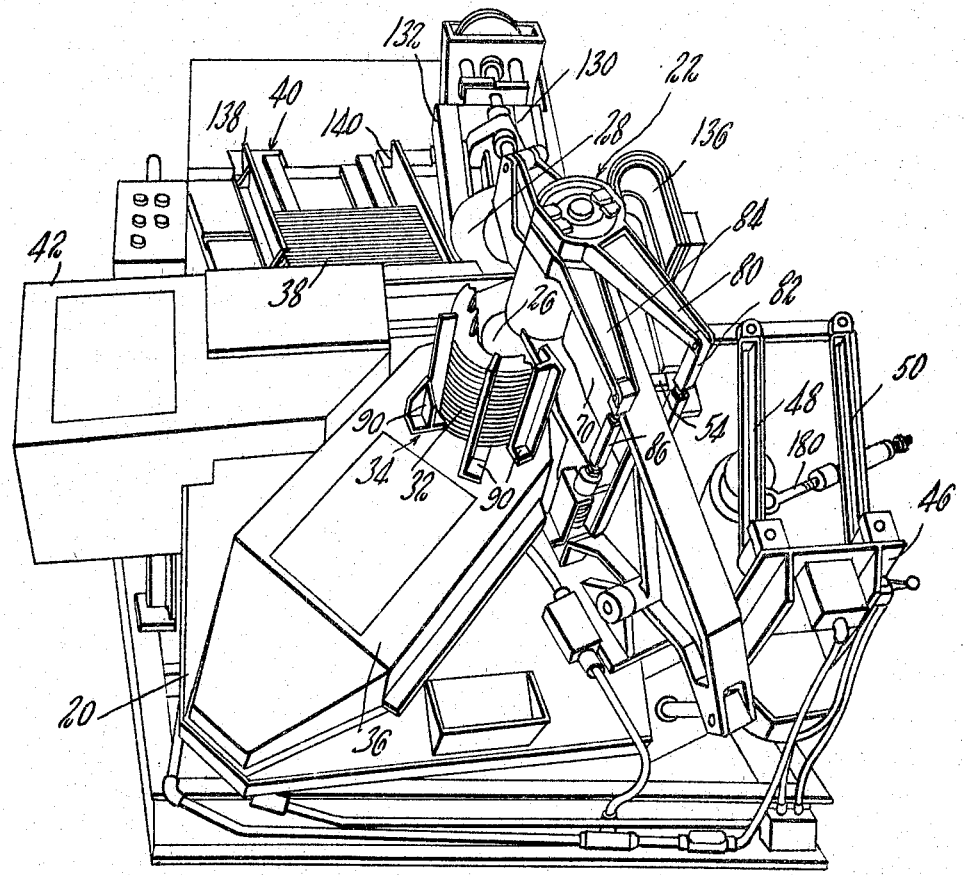
FIG. 1 is a perspective view of a brake welding machine embodying in a preferred form the several features of the invention.

The machine shown in the drawings as embodying in a preferred form the several features of the invention comprises a base 20 set at a 45° angle from the horizontal, a welding head 22 comprising a lower head 24 and an upper head 26 supported to rotate on an axis which is normal to the supporting surface of the base and which leans forwardly at an angle of 45° from the vertical, and an electrode wheel 28 mounted to turn on an axis parallel to the rotational axis of the welding head 22. Arcuately shaped web blanks 32 are fed successively to holding surfaces provided between the upper and lower welding heads from a stack 34 supported and inclined forwardly on a 45° axis parallel to the axis of the welding head 22 by a feed mechanism mounted within the box 36 shown in FIG. 1. Rim blanks 38 are stacked in a magazine 40 which is inclined backwardly at a 45° angle so that the individual rim blanks may be fed directly into the nip provided between the welding head 22 and electrode wheel 28 in a plane which is normal to the plane of the supported web blanks so that the rim blank is brought into a face-to-edge relation to a supported arcuate web blank. Mechanism for advancing the rim blanks successively into operating position with respect to the weld device is housed within a box 42, the general position of these parts being illustrated particularly in FIGS. 1, 2 and 3 of the drawings. An ejector mechanism is provided which comprises a bracket 46 tilted forwardly on the base 20 at a 45° angle from the vertical and having supported thereon two parallel pivoted arms 48, 50 providing support for an electromagnet 52 and an ejector hook 54 which are moved on the parallel arms between welded brake receiving and a brake discharge position for the purpose of moving from the welding head and for discharging successively welded brake bands. The fully welded together brake band is shown in perspective in FIG. 7 comprising the rim 38 and the web 32 which have been placed in the face-to-edge relation and welded together in a continuous operation which causes the rim 38 to be conformed arcuately to the peripheral surface of the web 32.

For the welding operation the web 32 is located in one of two positioning cutouts 56 formed in the upper face of the lower head, each corresponding in shape with the web blank. In this manner the web 32 is supported in a plane normal to the rotational axis of the welding head and with the peripheral edge exposed. The upper head 26 is formed of two semicylindrical elements 58 and 60 which are independently movable toward and away from the lower head and are provided with spring fingers 62 (see FIG. 8). The lower head 24 is continuously driven by means of a downwardly extending drive shaft 64 forming part of the machine drive hereinafter described. Also as shown in FIG. 8, the semicylindrical element 58 of the upper head is secured to a downward extension of a hollow tube 66, the semicylindrical element 60 being similarly secured to the downward extension of a second hollow tube 68 which is slidable on the sleeve 66 formed in a housing 70 in which the entire upper head assembly is carried. The upper and lower heads are supported to turn as a unit by means of pins 72 which are shown in FIG. 9 secured to the face of the lower head 24 for engagement in a socket 74 formed in the opposed face of the upper head. Vertical movements of the head portions 58 and 60 to and from the clamping box are controlled by connections from two cams 76, 78 shown in FIG. 10 as forming part of the drive mechanism of the machine. The upper welding head portion 58 and sleeve 66 are actuated by means of cam 76 through connections which include a laterally extending arm 80 pivoted at one end to a bracket on housing 70, and having a peripheral slot and pin connection with the upper end of the sleeve 66. At the outer end the arm 80 is connected with a plunger 82, the lower end of which engages the cam 76. The upper welding head segment 60 and sleeve 68 are actuated by cam 78 through similar connections which include a laterally extending arm 84 pivoted to a bracket on the housing 70 and having a peripheral slot and pin connection with the upper end of the sleeve. The arm 84 is connected at its outer end to a plunger 86 which at its lower end rides against the cam 78.

The magazine in which the arcuate web blanks 32 are stacked comprises four upright posts 90 which are attached at their lower ends to a cover plate of the box 36 along the edge of an arcuate cutout in said plate which corresponds with the shape of the blanks, the two end posts being L-shaped to confine the ends of the respective blanks 32. The posts 90 are tilted forwardly at an angle of 45° which matches the tilt or inclination of the welding head. Each web blank 32 is thus supported in a plane normal to the axis of the welding head 22 so that the transfer of selected blanks from magazine to the welding position can be accomplished by shifting the selected blank laterally in said plane. The lowest one of the stacked blanks 32 is supported on a guideway which forms part of the mechanism for feeding the blanks from the stack to the welding head. The guideway referred to, as best shown in FIGS. 3 and 6, comprises a central supporting plate 96 and two edge guides 98 secured to the underside of the cover plate 94 of the box 36. The edge guides 98 are mortised to confine the two ends of the arcuate web blanks.

The web blank feed mechanism supported within the housing 36 as best shown in FIGS. 3 and 5 comprises a slide 100 mounted in guideways 102, 104 attached to the sides of the housing 36, which slide provides support for two spring pressed pusher rods 106, 108 on which are mounted web blank engaging pusher rods 110, 112. The pusher rods 106, 108 are slidably supported in blocks 114, 116 respectively mounted on the slide 100, and at their rear ends are slidably supported in a cross yoke 118 also mounted on the slide 100. Springs 120 coiled about the respective pusher rods between the yoke 118 and shouldered portions of the rods maintain the rods and rolls 110, 112 yieldably in a forwardly extended position on the slide 100. A reciprocatory movement is imparted to the slide 100 through driving connections including a crank shaft 122 which extends from beneath into the housing 36 and is provided at its upper end with a crank arm 124 connected by means of a link 126 with a pin 128 on the slide 100. The reciprocating feed and return movements of the slide 100 are synchronized with the rotational movement of the welding head 22 through the operation of the drive mechanism for the machine as shown and hereinafter described in connection with FIG. 10.

In the illustrated construction as previously pointed out the several cooperating elements of the machine including the welding head 22, the web blank magazine consisting of the posts 90, and the web blank feed mechanism are all canted or tipped forwardly at the same 45° angle from the vertical. The magazine feeds by gravity to a pusher device having a simple forward and back motion to push successive web blanks from the magazine along a single plane into position in the welding head. In order to provide an adequate support for the arcuately curved web blank during the transfer from magazine to welding head while tipped in the manner described at a 45° angle, the web blank magazine and feed mechanism are located with respect to the welding head as shown particularly in FIG. 3 so that the feed rolls 110, 112 push the arcuately shaped blank diagonally upwardly along a 45° slope. Advancing movement of the slide 100 and feed rolls 110, 112 is timed with relation to the rotating welding head so that the arcuately shaped web blank is brought against the welding head at the same time that one of the position cutouts above mentioned moves into receiving position, the slide 100 being arranged to overtravel sufficiently to compress springs 120 so that the blank is slid immediately into position as the positioning cutout moves into exact register therewith. The yielding supporting action of the rolls 110, 112 permits the web blank to be held in position until the downward movement of the cooperating upper welding head segment 58 or 60 and associated spring clamping members 62 causes said head segment to be brought into clamping engagement therewith.

The electrode wheel 28 cooperates in a normal manner with the welding head 22 to provide a supporting nip for the rim blank presented against the peripheral surface of the welding head in face-to-edge relation with the arcuate web blank supported between the upper and lower elements of the welding head. A slide 130 mounted on ways 132 for adjustment toward and away from the welding head provides support for a pivot pin 134 on which the electrode wheel 28 is loosely mounted to turn. Current for the welding operation is supplied to the welding wheel 28 through connections including the connector 136 shown in FIG. 1. Inasmuch as this mechanism is well known and forms no part of the invention further description and illustration thereof is omitted herefrom.

Rim blanks 38 are supplied to the welding device at the nip between the electrode wheel 28 and welding head from a rim blank magazine consisting of a pair of guides 138, 140 secured at their lower ends to a base support 142 which houses the mechanism for transferring successive rim blanks from the magazine to said electrode wheel and welding head nip. The magazine comprising the base support 142 and guides 138, 140 is adjustable upwardly and down on the frame 20. The magazine including the plate 146 is tilted backwardly 45° from the vertical so that the stack of rim blanks rises normal to the plane in which the rim blank is presented to the welding nip. The bottom rim blank 38 of those stacked in the magazine is supported on a plate 146 which is mounted within the base support 142 and forms therewith a guideway on which the blanks are transferred successively along a single plane from the magazine to the welding nip.

The rim blank feed mechanism supported within the housing 42, as best shown in FIGS. 3 and 4, comprises a slide 148 arranged to ride in V-shaped guideways 150, 152 lengthwise of the base support 142. A pusher block 154 is mounted on the slide 148 to ride in a slot 156 formed in the base plate 146 for engagement behind the end of the rim blank from the stack 38 immediately adjacent and resting on the base plate 146.

Reciprocatory feeding and return movements are imparted to the rim feed slide 154 in timed relation to the operation of other machine parts by means of a rotating drive shaft 160 which extends upwardly at a forwardly inclined angle into the housing 42 and carries at its upper end a crank arm 162 connected through a link 164 with a pivot block 166 secured to the underside of the slide 148. A pivotal connection is provided between link 164 and block 166 which comprises a sleeve element 168 fixed to the link having trunnions pivotally supported in ears formed on the block 166.

Upon completion of the welding operation, and as soon as a welded brake band passes out of the nip between the electrode wheel 28 and welding head, the clamping segment of the upper head engaging said brake band moves upwardly to release and the ejector device moves in from the right to engage and remove the welded brake band from its recess in the lower welding head as shown in FIG. 3. The ejector device is reciprocated between pick up and retracted discharge positions through connections which include a forwardly and upwardly extending drive shaft 176 provided at its upper end with a crank 178 connected by a link 180 with one of the parallel supporting arms 50 for the ejector device. The reciprocatory movement of the ejector device is timed to the rotational movement of the welding head to cause the ejector hook 54 to engage and partially dislodge the leading end of the welded brake band from the lower welding head, the brake band then being held by the energized electromagnet 52 against two spaced positioning rolls 182, 184 forming part of the ejector device, the position being that shown in FIG. 3. As the parallel arms 48, 50 reach the limit of their retracting movement to the right electromagnet 52 is deenergized releasing the brake band which is thus discharged into a suitable receptable 186. Because the entire welding head and ejector device assemblies are canted forwardly at a 45° angle, the welded brake band is moving downwardly when engaged by the ejector hook 54 which acts also as a support for the brake band during the lateral movement of the ejector device to the discharge position.

The several operating devices of the machine are driven in timed relation to one another from an electric motor 190 through suitable driving connections diagrammatically shown in FIG. 10 of the drawings. These parts are mounted in the lower portion of the machine beneath the frame 20 and are disposed with relation to a reference plane which slopes at a 45° angle upwardly from front to back. The drive is taken from the motor 190 through shaft 192 and reduction gear box 194 to a main drive shaft 196. A bevel gear 198 on shaft 192 meshes with a bevel gear 200 on a forwardly and upwardly projecting drive shaft 202 which is connected through gears 204, 206 to the welding head drive shaft 64. The upwardly projecting drive shaft 202 is also connected through bevel gears 208, 210 with a laterally extending shaft 212 which is connected adjacent its outer end by bevel gears 214, 216 with the rim blank pusher crank shaft. The drive shaft 212 is also connected through bevel gears 218, 220 with a branch drive shaft 222 connected at its outer end through bevel gears 224, 226 with the forwardly and upwardly extending web blank pusher crank shaft 122. A forward extension of the main drive shaft 196 is connected through bevel gears 228, 230 with a forwardly and upwardly extending drive shaft 232. The ejector device crank shaft 176 is driven from the drive shaft 232 by means of a belt 234 which passes around a pulley 236 on the shaft 232 and around a pulley 238 on ejector crank shaft 176. Cams 76 and 78 for moving the segments of the upper welding head longitudinally to and away from the clamping position are supported on a transversely extending cam shaft 240 which is also driven from the drive shaft 32 through bevel gears 242, 244. The welding current may be turned on at the beginning of each welding operation and then turned off through connections timed to the operation of the machine which include a cam 250 on the main cam shaft 196 which is engaged by a switch arm 252 from a start and stop control switch 254. Electromagnet 52 of the ejector device is energized and deenergized in the proper timed relation by means of a cam 256 on the main cam shaft 196 which is engaged by a switch arm 258 of a control switch 260. Inasmuch as the welding mechanism of the machine and the electrical connections therefor and also the electrical connections for the electromagnet 52 are well known in the art, and forms specifically no part of the present invention, no further illustration or description thereof is believed necessary.

The invention having been described what is claimed is:

1. In a machine for welding a band to the peripheral edge of an arcuate web in face-to-edge relation, the combination of a cylindrically formed welding head rotatable on an axis inclined at a substantial angle from the vertical having axially separable transverse clamping faces providing peripheral margins for clamping said web with the arcuate edge theerof exposed, an electrode wheel providing a welding nip between said web blank and a transversely fed band in face-to-edge relation in intersecting planes each sloping at a substantial angle from the vertical, individual pusher feed devices for advancing successive band blanks and web blanks held flat in said respective planes to said nip, and gravity feed magazines in which said band blanks and web blanks are tiered for movement successively into said planes and into operative relation to said respective pusher feed devices along paths sloped at substantial angles from the horizontal to effect said gravity feed.

2. In a machine for welding a band to the peripheral edge of an arcuate web in face-to-edge relation, the combination of a cylindrically formed welding head rotatable on an axis inclined at roughly 45° from the vertical having axially separable transverse clamping faces providing peripheral margins for clamping said web with the arcuate edge thereof exposed, an electrode wheel providing a welding nip between said web blank and a transversely fed band in face-to-edge relation in intersecting planes each sloping roughly 45° from the vertical, a web blank magazine in which web blanks are stacked for delivery by gravity to a plane normal to said welding head axis, a web blank pusher feed device on which web blanks are successively advanced in said plane from said magazine between the clamping faces of said welding head, a band blank magazine in which band blanks are stacked for delivery in the plane of said nip, and a band blank pusher feed device on which band blanks are successively advanced between said band blank magazine and said nip.

3. In a machine for welding a band to the peripheral edge of an arcuate web in face-to-edge relation, the combination of a cylindrically formed welding head rotatable on an axis inclined roughly 45° from the vertical having axially separable transverse clamping faces providing peripheral margins for clamping said web with the arcuate edge thereof exposed, an electrode wheel having its axis in the same vertical plane with said welding head providing a welding nip between a web blank and a transversely fed band blank in edge-to-face relation in normally intersecting planes each sloping roughly 45° from the horizontal, a band blank gravity feed magazine and pusher feed assembly operable for advancing band blanks successively into said nip, a web blank magazine in which web blanks are stacked for delivery by gravity to a plane normal to said welding head axis, a web pusher feed device on which web blanks are successively advanced from said web blank magazine in said plane between said welding head faces in advance of said nip, a welded article ejector device comprising a magnetic gripper, a reciprocating carrier on which said gripper is shifted between welded article pick up and discharge positions, and timing means acting in timed relation to said reciprocating movement to energize and to deenergize said magnet.

4. In a machine for welding a band to the peripheral edge of an arcuate web in face-to-edge relation, the combination of a cylindrically formed welding head rotatable on an axis inclined roughly 45° from the vertical having axially separable transverse clamping faces providing peripheral margins for clamping said web with the arcuate edge thereof exposed, an electrode wheel providing a welding nip between said web blank and a transversely fed band in face-to-edge relation in normally intersecting planes each sloping roughly 45° from the horizontal, means for feeding successive web blanks between said clamping faces, means for feeding successive band blanks to said nip, a welded article ejector device comprising a magnetic gripper, parallel arms supporting said gripper pivoted for movement in a plane normal to the axis of said welding head between welded article pick up and discharge positions, a pick off finger movable with said gripper to engage and dislodge the welded article from between said clamping faces, means for energizing and deenergizing said magnetic gripper, and means for actuating each of said rotating welding head, blank feed devices, transverse clamping faces and welded article ejector device in timed relation in a series of welding cycles.

5. In a machine for welding a band to the peripheral edge of an arcuate web in face-to-edge relation, the combination of a cylindrically formed welding head rotatable on an axis inclined roughly 45° from the vertical having axially separable recessed positioning and clamping faces for clamping said web with the arcuate edge thereof exposed, an electrode wheel providing a welding nip with an upwardly turned peripheral portion of said welding head for welding said band to said web in face-to-edge relation, a gravity feed magazine and pusher feed assembly for advancing bands transversely along the inclined plane of said nip between said electrode wheel and welding head, a web pusher feed device on which webs are advanced diagonally upwardly in the plane of said welding head recessed gripper face into said recessed positioning face in advance of said nip, said web pusher device comprising a guideway having bottom and edge guides and a spaced pair of pusher rolls engaging the peripheral arcuate surface of a said web, and driving means for the machine including connections for rotating said welding head and for advancing said web pusher device in timed relation thereto.

References Cited

UNITED STATES PATENTS

| | | | |
|---|---|---|---|
| 1,868,782 | 7/1932 | Whitworth et al. | 219—80 |
| 1,898,923 | 2/1933 | Whitworth | 219—81 |
| 2,340,448 | 2/1944 | Andren | 219—79 X |
| 2,752,618 | 7/1956 | Stern | 29—211 X |
| 2,777,082 | 1/1957 | May | 219—79 X |
| 3,020,634 | 2/1962 | Williamson et al. | 219—107 X |
| 3,317,702 | 5/1967 | Mann | 219—103 X |

FOREIGN PATENTS 968,373   9/1964   Great Britain.

RICHARD M. WOOD, *Primary Examiner.*

B. A. STEIN, *Assistant Examiner.*